(12) United States Patent
Luo et al.

(10) Patent No.: US 12,255,967 B2
(45) Date of Patent: Mar. 18, 2025

(54) METHOD AND SYSTEM FOR TRACKING EVENTS IN DISTRIBUTED HIGH-THROUGHPUT APPLICATIONS

(71) Applicant: YAHOO AD TECH LLC, Dulles, VA (US)

(72) Inventors: Haiyan Luo, San Jose, CA (US); John Cheng, Sunnyvale, CA (US); Yi Mao, Sunnyvale, CA (US); Herve Marcellini, Menlo Park, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 0 days.

(21) Appl. No.: 17/956,963

(22) Filed: Sep. 30, 2022

(65) Prior Publication Data
US 2023/0017318 A1 Jan. 19, 2023

Related U.S. Application Data

(63) Continuation of application No. 14/969,558, filed on Dec. 15, 2015, now Pat. No. 11,463,532.

(51) Int. Cl.
*G06F 9/54* (2006.01)
*G06F 11/34* (2006.01)
*H04L 67/306* (2022.01)
*H04L 67/50* (2022.01)
*H04L 67/53* (2022.01)

(52) U.S. Cl.
CPC ........... *H04L 67/535* (2022.05); *G06F 9/542* (2013.01); *G06F 11/3466* (2013.01); *H04L 67/306* (2013.01); *H04L 67/53* (2022.05)

(58) Field of Classification Search
CPC . G06F 9/542; G06F 9/54; G06F 11/30; G06F 11/3006; G06F 11/3065; G06F 11/3466
See application file for complete search history.

(56) References Cited

U.S. PATENT DOCUMENTS

| 7,194,664 | B1 * | 3/2007 | Fung ................... G06F 11/3636 714/45 |
| 7,523,191 | B1 | 4/2009 | Thomas et al. |
| 2002/0078147 | A1 | 6/2002 | Bouthors et al. |
| 2007/0022276 | A1 * | 1/2007 | Fritz ..................... G06F 9/3867 712/227 |
| 2008/0114875 | A1 | 5/2008 | Anastas et al. |
| 2009/0164979 | A1 * | 6/2009 | Fischer ............... G06F 11/3495 717/128 |

(Continued)

FOREIGN PATENT DOCUMENTS

WO WO-2013027780 A1 * 2/2013

*Primary Examiner* — Lesa M Kennedy
(74) *Attorney, Agent, or Firm* — Venable LLP

(57) ABSTRACT

The present teaching relates to tracking an event at a plurality of distributed servers. In one example, an event to be tracked is determined. A user associated with the event is identified. A script is generated to be embedded in a web page. The script triggers an event message when the user performs an online behavior related to the web page in accordance with the event. The event message triggered by the script is received. A tracing flag is determined from the event message. An instruction is provided to the plurality of distributed servers for executing one or more applications based on the event and the tracing flag.

20 Claims, 14 Drawing Sheets

(56) References Cited

U.S. PATENT DOCUMENTS

| | | |
|---|---|---|
| 2011/0251896 A1 | 10/2011 | Impollonia et al. |
| 2011/0264787 A1 | 10/2011 | Mickens et al. |
| 2011/0271175 A1 | 11/2011 | Lavi et al. |
| 2012/0017156 A1 | 1/2012 | Broda et al. |
| 2014/0281030 A1* | 9/2014 | Cui ................ H04L 43/026 709/244 |
| 2015/0205776 A1 | 7/2015 | Bhatia et al. |
| 2015/0212925 A1 | 7/2015 | Granshaw et al. |
| 2016/0092914 A1 | 3/2016 | Wiener et al. |
| 2016/0092929 A1 | 3/2016 | Huang et al. |

* cited by examiner

METHOD AND SYSTEM FOR TRACKING EVENTS IN DISTRIBUTED HIGH-THROUGHPUT APPLICATIONS

CROSS REFERENCE TO RELATED APPLICATION

The present application is a continuation of U.S. patent application Ser. No. 14/969,558, filed on Dec. 15, 2015, entitled "METHOD AND SYSTEM FOR TRACKING EVENTS IN DISTRIBUTED HIGH-THROUGHPUT APPLICATIONS", which is hereby incorporated by reference in its entirety.

BACKGROUND

1. Technical Field

The present teaching relates to methods, systems, and programming for application tracing. Particularly, the present teaching is directed to methods, systems, and programming for tracking events in distributed high-throughput applications.

2. Discussion of Technical Background

Within a hosted multi-tenant environment or a distributed computation framework, there are a few issues that hinder effective troubleshooting and affect productivity of engineers, especially when engineers do not even have any permission to install additional packages. In Storm applications, e.g., thousands of workers might be running on a same Storm topology. Within each worker, there are many spouts and bolts running simultaneously. It is thus difficult to find out a given traffic is routed to which worker.

Existing techniques make use of log files for tracing applications. For high-throughput applications like Storm, a storm log is generated and aggregated for each storm worker. Within each storm log, the debug information from different bolts and spouts are interleaved together, making it really difficult to find out useful information. Therefore, it is extremely difficult to track any event and to troubleshoot among all these tons of interleaved trace messages, based on log files.

Therefore, there is a need to develop techniques to track an event in high-throughput applications to overcome the above drawbacks.

SUMMARY

The present teaching relates to methods, systems, and programming for application tracing. Particularly, the present teaching is directed to methods, systems, and programming for tracking events in distributed high-throughput applications.

In one example, a method, implemented on a machine having at least one processor, storage, and a communication platform capable of connecting to a network for tracking an event at a plurality of distributed servers is disclosed. An event to be tracked is determined. A user associated with the event is identified. A script is generated to be embedded in a web page. The script triggers an event message when the user performs an online behavior related to the web page in accordance with the event. The event message triggered by the script is received. A tracing flag is determined from the event message. An instruction is provided to the plurality of distributed servers for executing one or more applications based on the event and the tracing flag.

In a different example, a system having at least one processor, storage, and a communication platform capable of connecting to a network for tracking an event at a plurality of distributed servers is disclosed. The system includes an application tracing controller configured for determining an event to be tracked and identifying a user associated with the event; a script generator/updater configured for generating a script to be embedded in a web page, wherein the script triggers an event message when the user performs an online behavior related to the web page in accordance with the event; a trouble event detector configured for receiving the event message triggered by the script; a tracing flag reader configured for determining a tracing flag from the event message; and an application instruction generator configured for providing an instruction to the plurality of distributed servers for executing one or more applications based on the event and the tracing flag.

Other concepts relate to software for implementing the present teaching on tracking events in distributed high-throughput applications. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for tracking an event at a plurality of distributed servers is disclosed. The information, when read by the machine, causes the machine to perform the following: determining an event to be tracked; identifying a user associated with the event; generating a script to be embedded in a web page, wherein the script triggers an event message when the user performs an online behavior related to the web page in accordance with the event; receiving the event message triggered by the script; determining a tracing flag from the event message; and providing an instruction to the plurality of distributed servers for executing one or more applications based on the event and the tracing flag.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
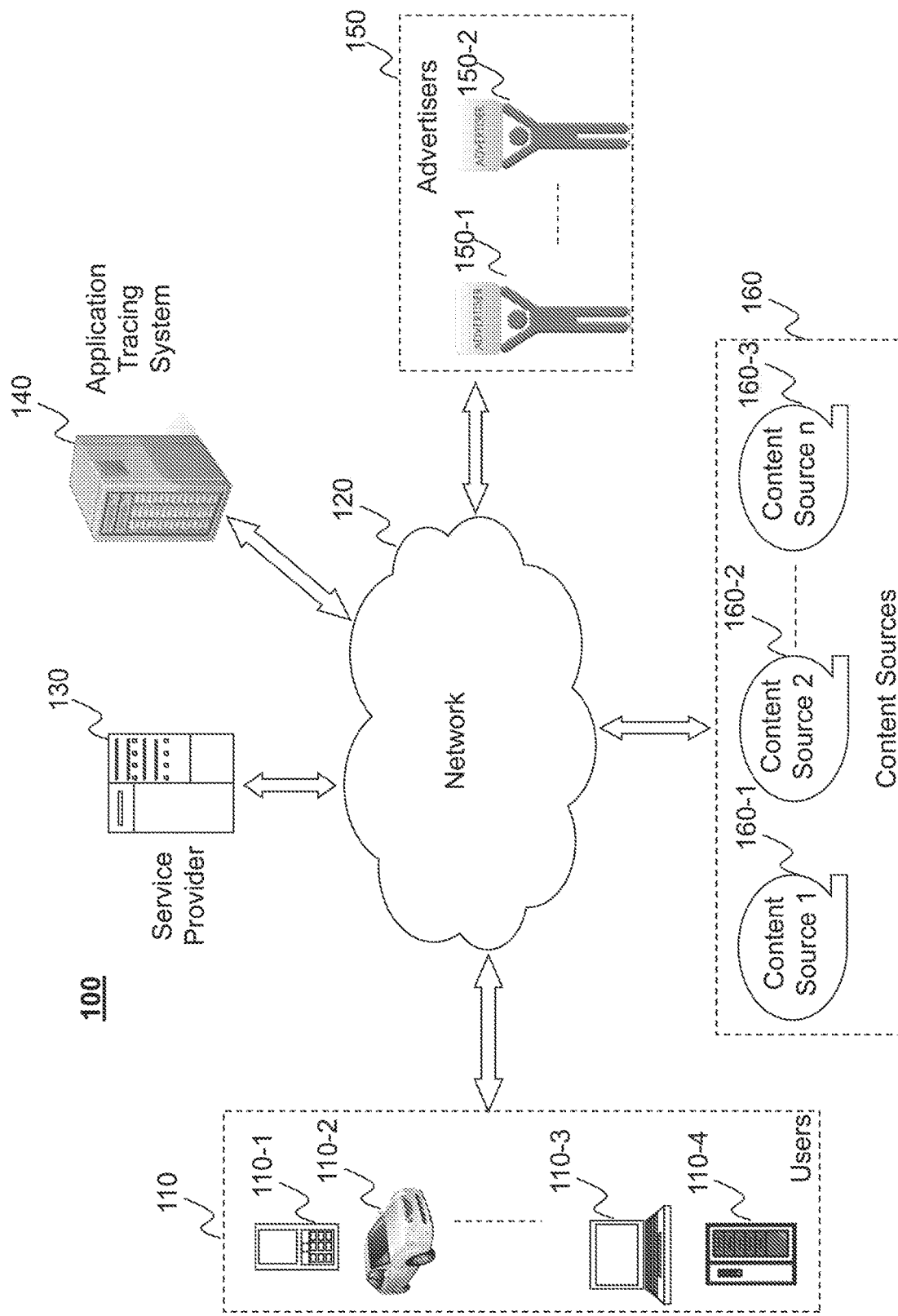
FIG. 1 is a high level depiction of an exemplary networked environment for tracking an event in high-throughput applications, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of tracking an event in high-throughput applications, realized as a specialized and networked system by utilizing one or more computing devices (e.g., mobile phone, personal computer, etc.) and network communications (wired or wireless). The method and system as disclosed herein aim at tracking an event in high-throughput applications in an effective and efficient manner.

Within a hosted multi-tenant environment or a distributed computation framework, there are a few issues that hinder effective troubleshooting and affect productivity of engineers, especially when engineers do not even have any permission to install additional packages. For example, in Apache Storm or Spark applications, thousands of workers might be running on a same topology. Within each storm worker, there are many spouts and bolts running simultaneously. Spouts and bolts may refer to information sources and manipulations respectively in Storm applications for distributed processing of streaming data. It is thus difficult to find out a given traffic is routed to which worker, especially when running the topology in shuffle mode.

In high-throughput applications, e.g. when the query per second (QPS) is around 50K with 20 nodes and nearly 1000 spouts and bolts running, it is difficult to track any event based on log files, because each log includes debug information from different bolts and spouts interleaved together, especially for applications executed by a distributed system. Software engineers often have to waste enormous amount of time reproducing an issue on a mini storm topology with very few storm workers, while trying to simulate the real traffic. Sometimes, it is not even possible to reproduce based on log files.

Disclosed herein includes novel methods and systems for tracking an event in high-throughput applications, thus greatly promoting debugging pleasure for any high-throughput application. The tracking may be based on a smart pixel application running on a Near Real-Time (NRT) platform, e.g. a storm-based NRT ad targeting platform.

In one embodiment, an application tracing system disclosed herein may generate a script, e.g. a Javascript, to be embedded in a web page by a service provider. For example, a provider of a news website may receive the script and embed it into an HTML, web page at the website, such that after a user accesses the web page or clicks a link on the web page, the script can trigger a smart pixel event. The system may put customized data in the script, such that the customized data can be passed on the NRT storm spout when the pixel is fired. A pixel here may refer to a small set of script codes that corresponds to an event. For example, a tracing flag may be added to indicate the storm topology that this specific pixel needs to be tracked while processing it in the storm topology. In one example, the customized data may be determined based on a user profile of the user.

When the system receives this smart pixel event in the storm spout, the system can parse the customized data and retrieve this tracing flag. With an on/off switch, the system can print out detailed debug messages, e.g. into a string buffer in the format of JSON (JavaScript Object Notation). This string along with the tracing flag can then be passed on to the subsequent bolts, to append more detailed tracing information. After finishing processing this pixel at the final bolt, the system can enclose the JSON string. The system can report the JSON debug string onto a storm UI (user interface), such that it is easy to read and debug. Further, the system can report the debug or tracing information to a web server, which can render the results more nicely.

The system can also retrieve other information from the customized data. For example, the system can retrieve a tracing level from the customized data and instruct each bolt to generate and append tracing information based on the tracing level.

In one embodiment, other than using customized data, the system may use any service that can pragmatically send tracing commands to the storm topology to accomplish the same purpose. For example, an interactive debug and management tool can send a tracing command and parameters to the storm topology. Then it can start tracing the pixel and send back the tracing information to the tool after application is executed.

The disclosed method can significantly simplify debugging and troubleshooting, thus greatly improving the productivity for developers, testers and technical supports. It is easy to implement. It does not need any third party software or any additional hardware support. The disclosed method is very streamlined and user-friendly. Users may look at the well-formatted JSON debug log and easily identify issues and understand the whole processing flow. Since it can be based on JSON with well-worded tracing message, it is also very suitable for technical supports to troubleshoot, avoiding any additional work from developers.

In addition, the disclosed method can support real-time debugging, such that a tester does not have to wait for log processing, when the storm state may have already changed. It is a non-intrusive method, where there is almost no additional overhead to the storm applications. As such, there is no performance impact to the storm applications.

Furthermore, the disclosed method is easy to detect and easy to reproduce customer issue. Given the pixel information, the system can easily install a corresponding script on any web page and fire the pixel with a tracing flag on to reproduce and debug it, making the troubleshooting process easy and pleasant.

It can be understood that the disclosed method may be widely used for any storm applications, or any other applications with high-throughput, for easy troubleshooting. Throughput does not affect the usability of the disclosed method.

In one embodiment, the disclosed method may be applied to ad targeting applications for determining an advertisement to be presented to a user. The event to be tracked in the ad target applications may be determined based on a tracing request from an advertiser or a detected abnormality related to the event. After the tracing, the system can generate a report of tracing information generated along an entire life span of the event, and send the report to a technical support or directly to the advertiser.

The terms "ad" and "advertisement" maybe used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for tracking an event in high-throughput applications, according to an embodiment of the present teaching. In FIG. 1, the exemplary networked environment 100 includes one or more users 110, a network 120, a service provider 130, an application tracing system 140, one or more advertisers 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 120 may be an online advertising network or ad network through which a company connects advertisers to web sites that want to host advertisements.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the service provider 130 and the application tracing system 140 through wired or wireless technologies and related operating systems implemented within user-wearable devices (e.g., glasses, wrist watch, etc.). A user, e.g., the user 110-1, may send a request for content and/or advertisements to the service provider 130, via the network 120, and receive content and/or advertisements from the service provider 130 through the network 120.

The service provider 130 may correspond to an entity, an individual, a firm, or an organization, such as a television station, a newspaper issuer, a web page host, an online service provider, or a game server. The service provider 130 may be an organization such as USPTO.gov, a content provider such as CNN.com and Yahoo.com, or a content-feed source such as tweeter or blogs. In one embodiment, the service provider 130 includes entities that develop, support and/or provide online content via mobile applications (e.g., installed on smartphones, tablet devices, etc.).

Referring to the above example, the service provider 130 may provide content obtained from the content sources 160 based on a request from a user. The request may incorporate a query. A content source may correspond to an entity where the content was originally generated and/or stored. The content sources 160 in the exemplary networked environment 100 include multiple content sources 160-1, 160-2 . . . 160-3.

When content is sent to the user 110-1, one or more advertising opportunities may be available for one or more advertisements to be presented with the content to the user 110-1, on a same web page, via a same application, or in a same user session. For an available advertising opportunity, the service provider 130 may send a request to the application tracing system 140 for selecting advertisements provided by the advertisers 150 to be presented to the user. In this example, the application tracing system 140 provides ad targeting applications. The application tracing system 140 may select and provide advertisements that may be interesting to the user.

In addition, the application tracing system 140 may track an event during processing of the ad targeting applications. The tracking may be based on an abnormality detection related to the event at the application tracing system 140, or upon a tracing request from one of the advertisers 150. An event may be specified based on a user and an advertisement. For example, an advertiser has an ad displayed in a web page provided by the service provider 130, and wants to check or troubleshoot ad conversion, about how often a click on the ad can lead to valuable feedback to the advertiser, of the ad after the ad is clicked by a user. The advertiser can send the application tracing system 140 a tracing request to specify the user and the advertisement. Accordingly, the application tracing system 140 may generate a script to be embedded in the web page at the service provider 130. The script can trigger an event message sent to the application tracing system 140 when the user clicks on the advertisement on the web page next time. The event message includes some customized data about the user and a tracing flag to indicate that the ad conversion event should be tracked.

In one embodiment, the application tracing system 140 may have already sent a script to be embedded in the web page at the service provider 130, before receiving the tracing request from the advertiser. In that case, the application tracing system 140 may update the script to turn on the tracing flag to indicate that the next ad conversion event from the user should be tracked.

The application tracing system 140 may include servers for executing applications related to the ad conversion event. For example, each of servers can execute a task related to the ad conversion. Each server can check the tracing flag to determine that the ad conversion event should be tracked, such that the server may record some tracing information during the execution of the task. After the execution of the task, the server may integrate the tracing information with previous tracing information generated at previous servers, and integrate the execution result with previous execution results generated at previous servers. The server may then send the integrated tracing information and execution results to the subsequent server that will execute another task in the application. After all applications and all tasks are executed for the event, the application tracing system 140 may generate a report of the tracing information generated during life span of the event, and send the report to a technical support engineer to explain to the advertiser, or send the report to the advertiser directly.

It can be understood that applications other than ad targeting and events other than ad conversion may be supported by the application tracing system 140 as well. In general, the application tracing system 140 may track any event in any applications related to the service provider 130 easily with a script embedded in a web page at the service provider 130.

Figure 2:
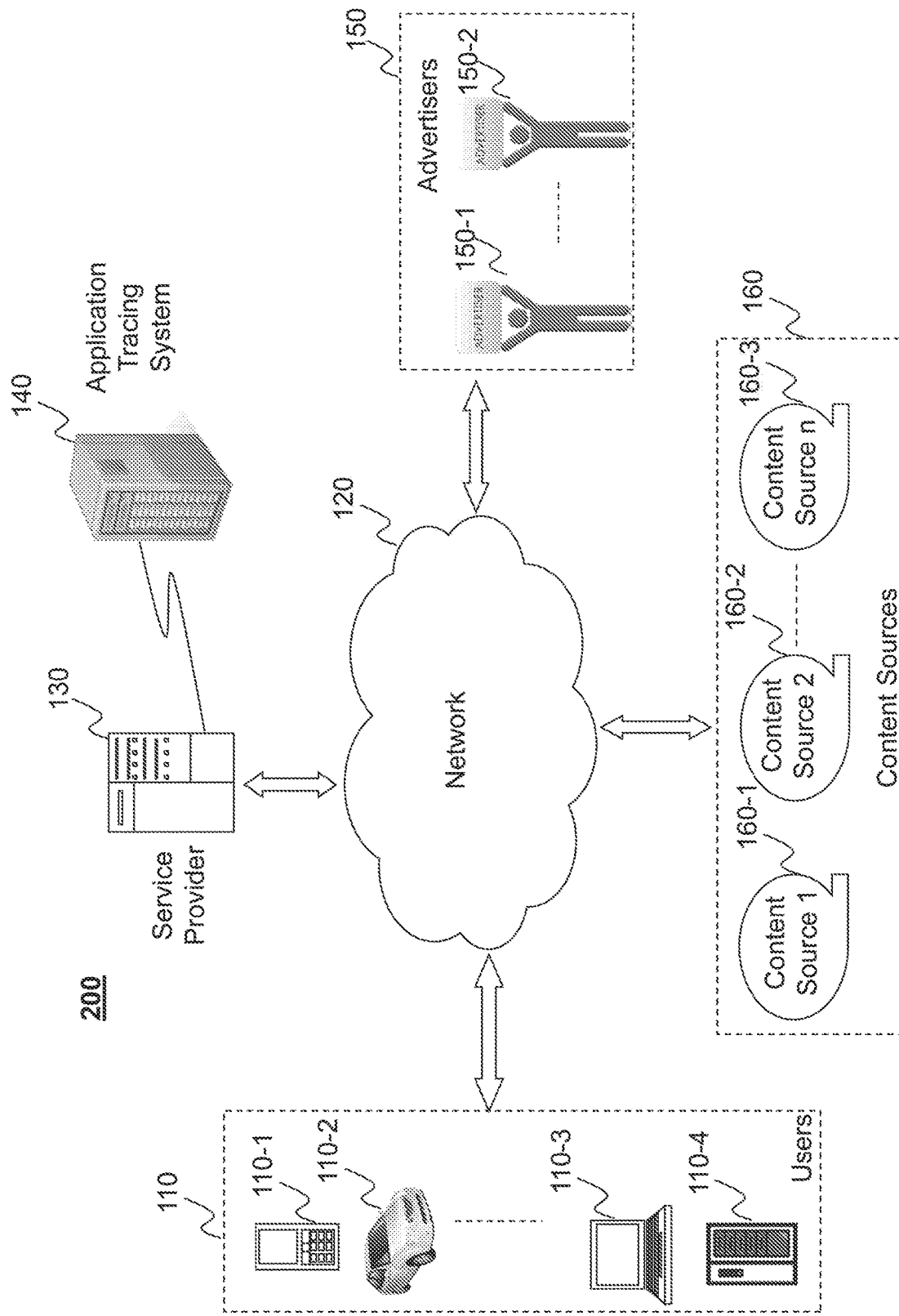
FIG. 2 is a high level depiction of another exemplary networked environment for tracking an event in high-throughput applications, according to an embodiment of the present teaching.

FIG. 2 is a high level depiction of another exemplary networked environment 200 for tracking an event in high-throughput applications, according to an embodiment of the present teaching. The exemplary networked environment 200 in this embodiment is similar to the exemplary networked environment 100 in FIG. 1, except that the application tracing system 140 serves as a backend system for the service provider 130.

Figure 3:
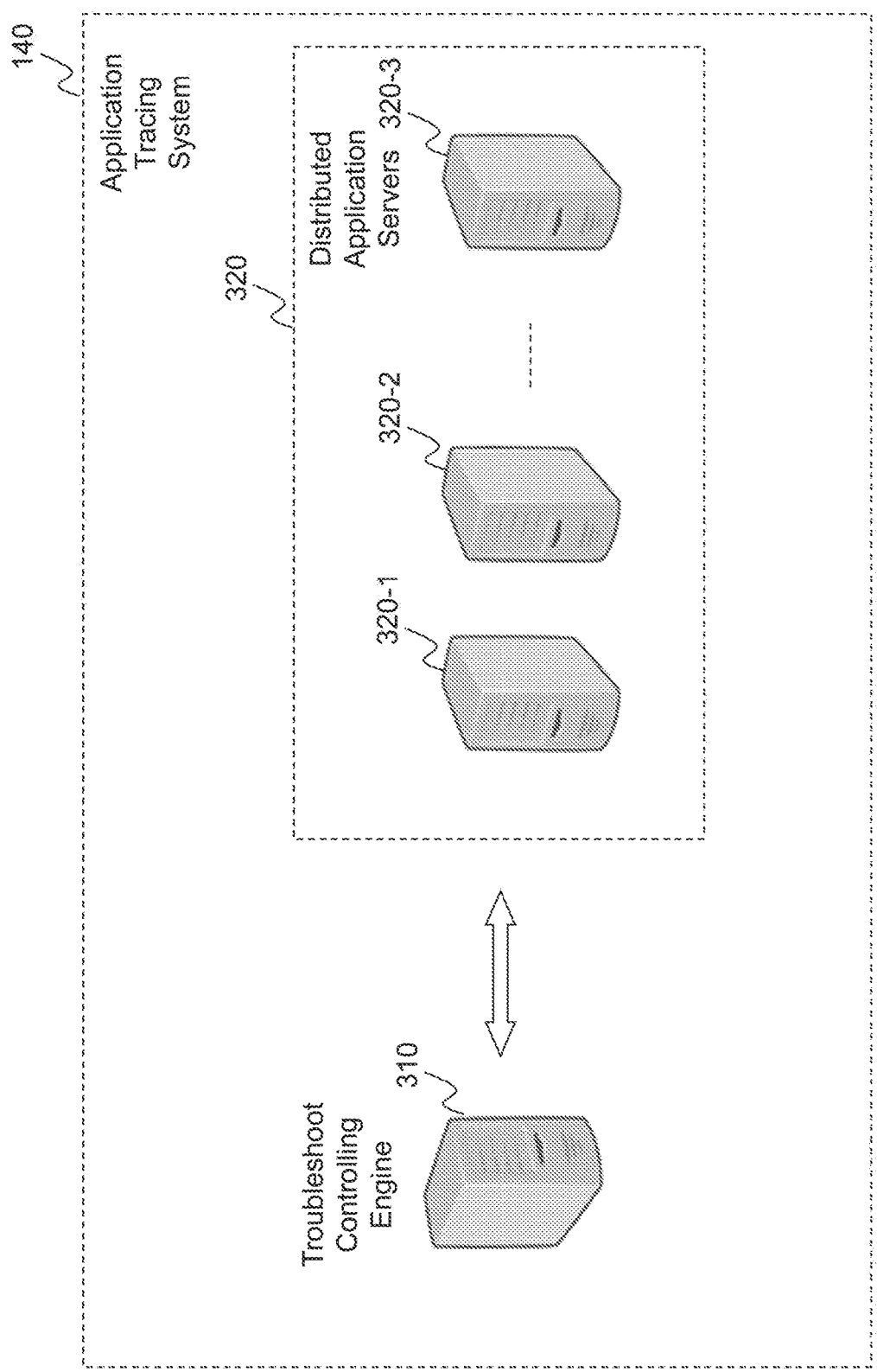
FIG. 3 illustrates an exemplary structure of an application tracing system, according to an embodiment of the present teaching.

FIG. 3 illustrates an exemplary structure of an application tracing system, e.g. the application tracing system 140 in FIG. 1 or FIG. 2, according to an embodiment of the present teaching. As shown in FIG. 3, the application tracing system 140 in this example includes a troubleshoot controlling engine 310 and a plurality of distributed application servers 320. The plurality of distributed application servers 320 may execute applications, e.g. high-throughput applications like Storm applications, Spark applications, in a distributed framework. The troubleshoot controlling engine 310 may control the event tracing or troubleshooting in the applications executed by the plurality of distributed application servers 320. The troubleshoot controlling engine 310 may be either a separate engine as shown in FIG. 3 or one of the distributed servers in another embodiment.

Figure 4:
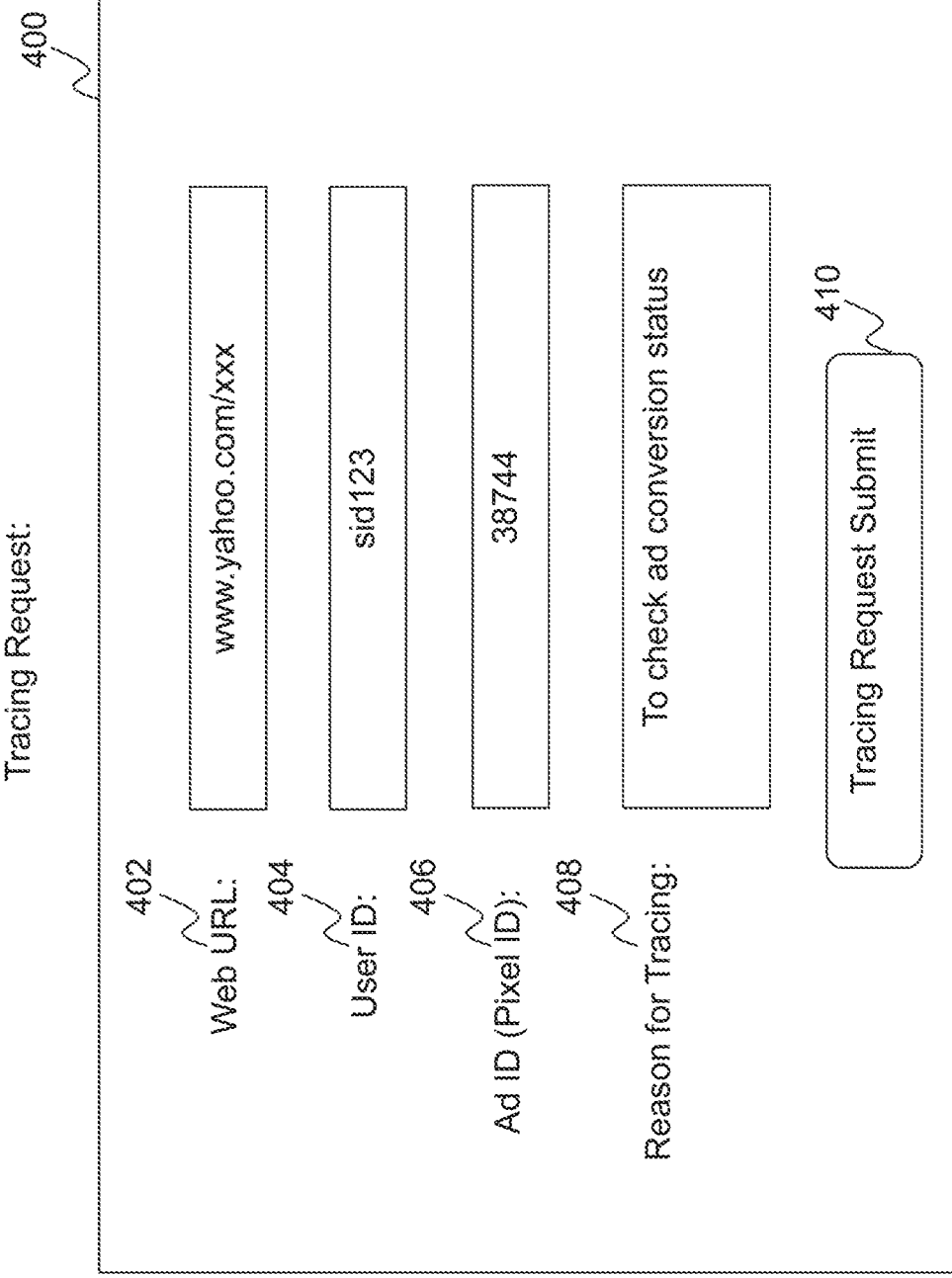
FIG. 4 illustrates an exemplary user interface, where a user submits a tracing request for an event, according to an embodiment of the present teaching.

FIG. 4 illustrates an exemplary user interface 400, via which a user can submit a tracing request for an event, according to an embodiment of the present teaching. The user referred here means a user of the application tracing system 140, e.g., a tester, an engineer, a technical supporter, an advertiser, etc. This user can be referred as tracing requestor.

As shown in FIG. 4, the user interface 400 in this example includes information about a web URL (Uniform Resource Locator) 402, a user ID (identity) 404, an ad ID 406, a reason 408 for tracing the event, and a tracing request submit button 410. The web URL 402 in this example represents a URL of a web page where the event will be triggered. In general the event may be any event associated with the web page, e.g. a search event after a user of the web page submits a query on the web page, a clicking event after the user clicks on a link on the web page, an ad conversion event after the user puts a goods related to an ad into the shopping cart, a browsing event after the user has dwelled on the web page for a given time, etc. As discussed above, based on each type of events, one or more high-throughput applications may be executed at the plurality of distributed application servers 320, in a distributed framework. The plurality of distributed application servers 320 may also execute applications related to other web pages, or even other service providers. As such, a tracing request for an event in the applications may not be fulfilled by convoluted log files. In this example, the tracing requestor enters in the user interface 400 that the web URL is: www.yahoo.com/xxx.

The user ID 404 in this example indicates the user associated with the event. The user referred here means a user of the web page. For a same hyperlink on the web page, different users clicking on it may cause different events. In this example, the tracing requestor enters in the user interface 400 that the user ID is: sid 123.

The ad ID 406 in this example indicates an advertisement related to the event. For a same user, clicking on different advertisements may also cause different events as well. In general, the ad ID 406 may indicate a pixel ID that can specify a given event. In this example, the tracing requestor enters in the user interface 400 that the ad ID (pixel ID) is: 38744.

The reason 408 in this example indicates a reason for tracing the event. For example, the tracing requestor enters in the user interface 400 that the reason for tracing the event is to check ad conversion status after the user sid 123 clicks on the advertisement 38744.

After the tracing requestor enters the information in the user interface 400, the tracing requestor may click the tracing request submit button 410 to submit to the application tracing system 140 a tracing request for tracking the event 38744.

Figure 5:
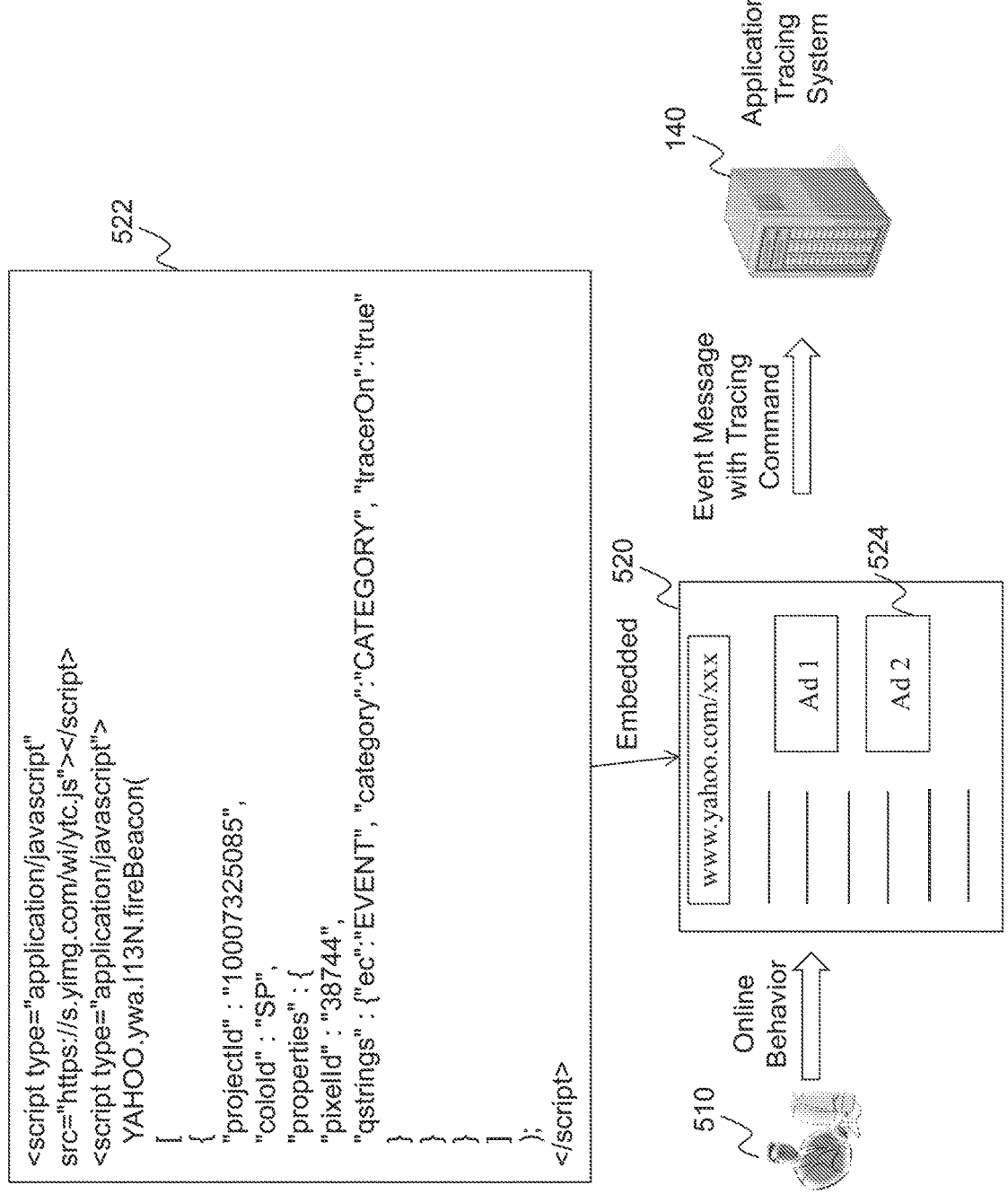
FIG. 5 illustrates an exemplary process where an exemplary script embedded in a web page may trigger an event message to be sent to an application tracing system, according to an embodiment of the present teaching.

FIG. 5 illustrates an exemplary process where an exemplary script 522 embedded in a web page 520 may trigger an event message to be sent to an application tracing system 140, according to an embodiment of the present teaching. As shown in FIG. 5, a script 522, which is an exemplary Javascript, is embedded in the web page 520. In addition to some standard information like pixelID, the Javascript 522 also includes some customized data under qstrings. In this example, any key value pair could be part of the customized data that can be passed on the storm spout when the pixel is fired. In particular, a key "tracerOn" is added in the script 522 with value "true" to indicate the distributed topology that the specific pixel (with pixelID 38744) should be traced while the system 140 processes the event in the distributed topology.

The event may be triggered by a user's online behavior on the web page 520. For example, the pixelID 38744 may correspond to an event, e.g. an ad conversion event, triggered when the advertisement 524 in the web page 520 is clicked by the user 510. In this example, after the user 510 clicks on the advertisement 524, the Javascript 522 embedded in the web page 520 can trigger an event message to be sent to the application tracing system 140, along with a tracing command for tracing the event during processing at the application tracing system 140. In one embodiment, the tracing command is included in the event message. Based on a pixelID, the application tracing system 140 can easily determine the event to be tracked. In addition, for any given tracing information, the application tracing system 140 can easily determine which event is described by the tracing information, based on a pixelID associated with the tracing information, even in a high-throughput distributed framework.

The application tracing system 140 or the service provider 130 may turn on or off the tracing flag "tracerOn" in the script 522, based on whether a tracing or troubleshooting is needed. In one embodiment, the Javascript 522 may be different for different users, such that one user clicking on an ad does not trigger an ad conversion tracking while another user clicking on the ad does trigger an ad conversion tracking. In another embodiment, the Javascript 522 may include more customized data related to a specific user, e.g. a tracing level for the user. A tracing level may indicate how detailed tracing information should be recorded during tracking a pixel event. Different users may be associated with different tracing levels for a same advertisement. In general, the application tracing system 140 or the service provider 130 may add any customized information into the script 522 as needed, e.g. for tracing or troubleshooting. Based on a tracing flag associated with an event, the application tracing system 140 can control whether the event should be tracked during processing, without using any log file.

Figure 6:
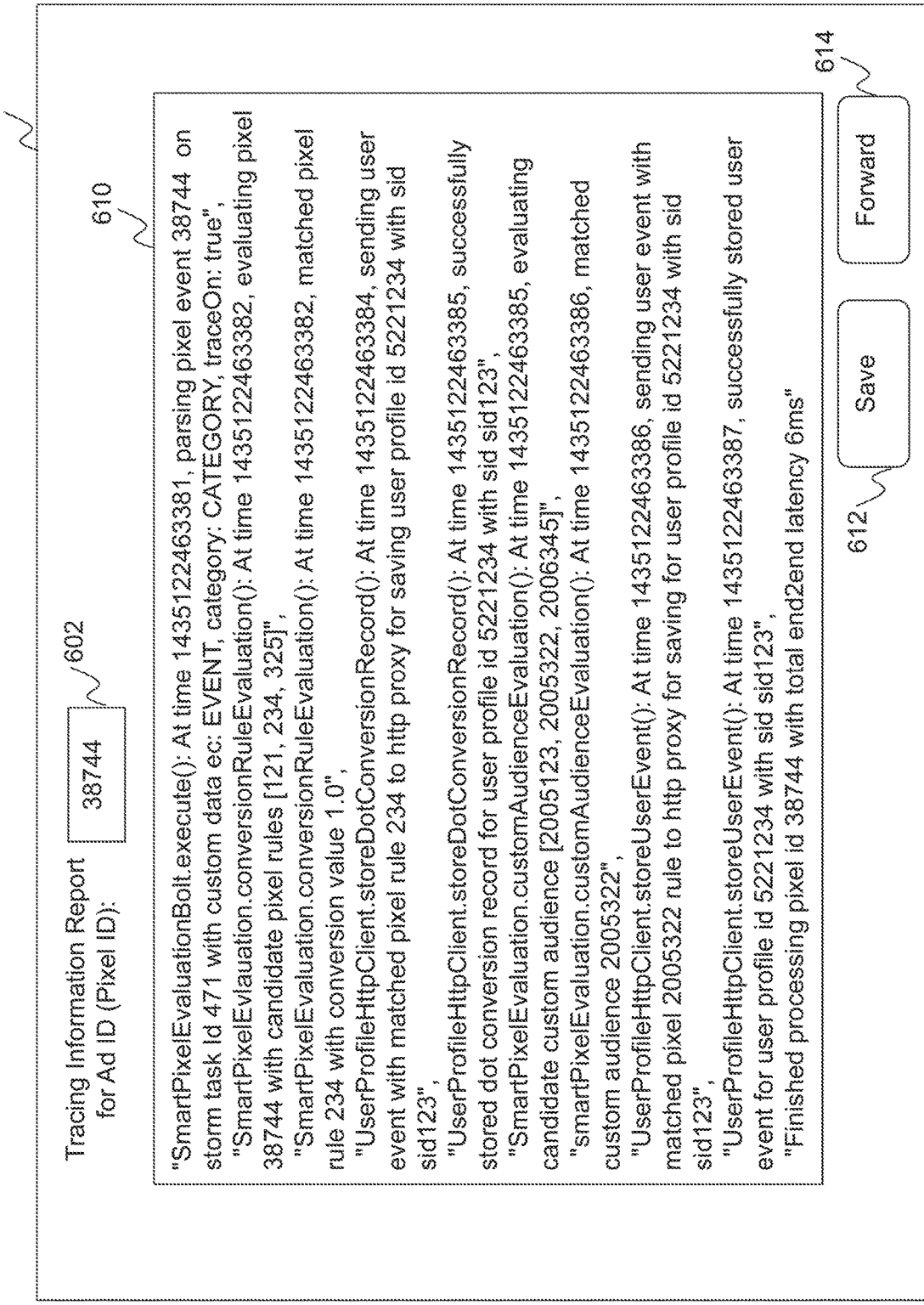
FIG. 6 illustrates an exemplary user interface, where a user can view a report about the tracing information of an event of interest, according to an embodiment of the present teaching.

FIG. 6 illustrates an exemplary user interface 600, where a user can view a report about the tracing information of an event of interest, according to an embodiment of the present teaching. The user referred here means a tracing requestor or a user of the application tracing system 140, e.g., a tester, an engineer, a technical supporter, an advertiser, etc.

As shown in FIG. 6, the user interface 600 includes an ad ID or pixel ID 602 to indicate which event is traced for the report. The user interface 600 also includes a list of tracing information 610 generated and recorded during execution of the applications related to the event. In this example, the list of tracing information refers to tasks executed for evaluating ad conversion about the ad ID 38744. The user interface 600 may also include a save button 612 and a forward button 614. The tracing requestor may click the save button 612 to save the report or click the forward button 614 to forward the report to others.

In one embodiment, the tracing requestor is not the same as the one receiving the report in the user interface 600. For example, after an advertiser submits a tracing request to the application tracing system 140, the application tracing system 140 may generate and send the tracing report in the user interface 600 to a technical supporter, who may explain the report to the advertiser and/or directly forward the report to the advertiser.

In one example, the user interface 600 may be a Storm UI and the application tracing system 140 may be a Storm system that provides OutputCollector which is a function that can report Error( ) or any tracing information to the storm UI. Accordingly, after the application tracing system 140 finishes the processing, the application tracing system 140 may leverage this function to report the tracing information, in form of JSON debug strings, onto the storm UI, which enables easy read and debug.

Figure 7:
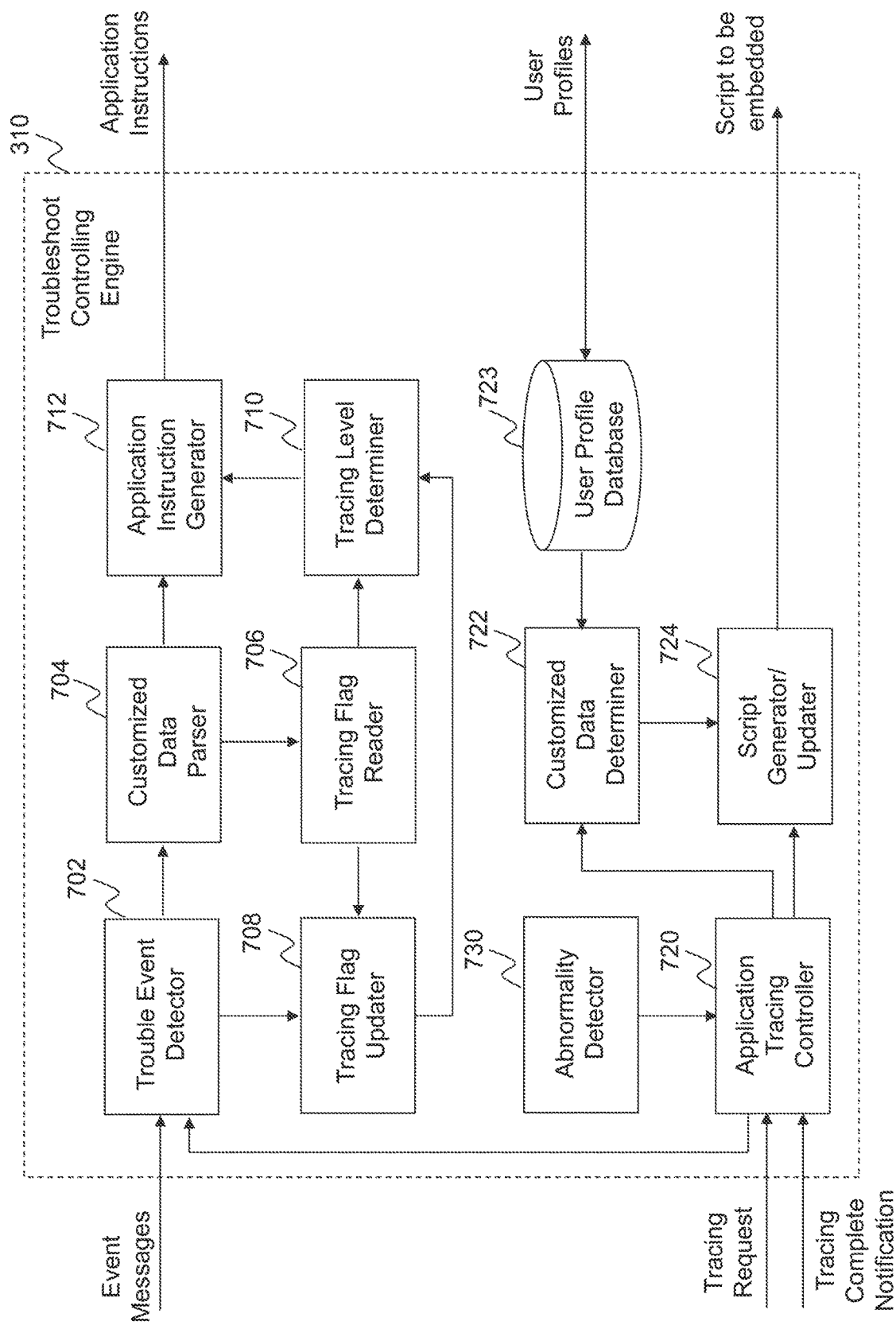
FIG. 7 illustrates an exemplary diagram of a troubleshoot controlling engine, according to an embodiment of the present teaching.

FIG. 7 illustrates an exemplary diagram of a troubleshoot controlling engine 310, according to an embodiment of the present teaching. As shown in FIG. 7, the troubleshoot controlling engine 310 in this example includes a trouble event detector 702, a customized data parser 704, a tracing flag reader 706, a tracing flag updater 708, a tracing level determiner 710, an application instruction generator 712, an application tracing controller 720, a customized data determiner 722, a script generator/updater 724, a user profile database 723, and an abnormality detector 730.

The trouble event detector 702 in this example receives event messages related to applications associated with a web page. In general, when any end users 110 perform some online behavior on the web page, corresponding event messages may be sent to the trouble event detector 702. The trouble event detector 702 may send information about a received event message to the customized data parser 704 for data parsing.

The customized data parser 704 in this example parses customized data from each event message received from the trouble event detector 702. After parsing, the customized data parser 704 can obtain detailed customized data associated with the event message. The customized data may include: personal information specific to the user triggering the event, information specific to the online behavior of the user, specific information related to a content item, e.g. an advertisement, on the web page when the event is associated with the content item, specific information related to a tracing requestor, e.g. an advertiser, who is interested in tracing information about the event, information about tracing, etc. The customized data parser 704 may send the customized data to the tracing flag reader 706 for tracing flag reading and to the application instruction generator 712 for generating an application instruction.

The tracing flag reader 706 in this example can receive the customized data from the customized data parser 704 and read a value of the tracing flag in the customized data. Based on the reading, the tracing flag reader 706 may determine whether the tracing flag is on or off, which indicates whether to track the event or not. The tracing flag reader 706 may send the tracing flag to the tracing flag updater 708 for a potential updating. The tracing flag reader 706 may also send the tracing flag and other customized data to the tracing level determiner 710 for determining a tracing level.

The tracing flag updater 708 in this example may update the tracing flag received from the tracing flag reader 706, e.g. based on a detection of a trouble event at the trouble event detector 702. In one embodiment, the trouble event detector 702 may receive information from the application tracing controller 720 to determine that a specific event should be monitored. For example, the application tracing controller 720 may determine that information tracing is needed for an ad clicking event associated with a certain ad and a certain user, based on either some abnormality detection or a received tracing request. After the application tracing controller 720 informs the trouble event detector 702 about the ad clicking event, the trouble event detector 702 can detect whether the received event messages include a message about the ad clicking event. If so, the trouble event detector 702 may send the trouble event of ad clicking to the tracing flag updater 708 for updating tracing flag. The tracing flag updater 708 in this case may turn on the tracing flag related to the ad clicking event, if the tracing flag read by the tracing flag reader 706 indicates that it is off.

In another embodiment, the trouble event detector 702 may receive information from the application tracing controller 720 to determine that a specific event should stop being monitored. For example, the application tracing controller 720 may determine that information tracing is no longer needed for an ad conversion event associated with a certain ad and a certain user, based on a tracing complete notification received from a tracing requestor. After the application tracing controller 720 informs the trouble event detector 702 about the ad clicking event, the trouble event detector 702 can detect whether the received event messages include a message about the ad clicking event. If so, the trouble event detector 702 may send the trouble event of ad clicking to the tracing flag updater 708 for updating tracing flag. The tracing flag updater 708 in this case may turn off the tracing flag related to the ad clicking event, if the tracing flag read by the tracing flag reader 706 indicates that it is on.

In either of the above two embodiment, the tracing flag updater 708 may update both the tracing flag read from the event message and the tracing flag in the script embedded in the web page. After the update, the tracing flag updater 708 may send the updated tracing flag to the tracing level determiner 710.

The tracing level determiner 710 in this example can determine whether a given event should be tracked based on the tracing flags received from the tracing flag reader 706 and the tracing flag updater 708. In one example, the tracing level determiner 710 receives tracing flags related to the event from both the tracing flag reader 706 and the tracing flag updater 708. Then the tracing level determiner 710 can determine whether the event should be tracked based on the tracing flag from the tracing flag updater 708. In another example, the tracing level determiner 710 receives the tracing flag related to the event from the tracing flag reader 706 but not from the tracing flag updater 708. Then the tracing level determiner 710 can determine whether the event should be tracked based on the tracing flag from the tracing flag reader 706.

If the tracing level determiner 710 determines that a given event should be tracked, the tracing level determiner 710 can further determine a tracing level for tracking the event, based on the customized data. The tracing level may indicate how detailed tracing information should be recorded during processing the event. The tracing level determiner 710 can send the tracing level to the application instruction generator 712, along with the determined tracing flag. If the tracing level determiner 710 determines that a given event should not be tracked, e.g. when the tracing flag is turned off, the tracing level determiner 710 can forward the tracing flag to the application instruction generator 712 without determining any tracing level.

The application instruction generator 712 in this example receives customized data, tracing flag, and/or tracing level related to each event received at the trouble event detector 702. Based on the received information, the application instruction generator 712 can generate an application instruction to indicate whether and how to track the event during execution of the one or more applications associated with the event. In one embodiment, the application instruction generator 712 sends the application instruction to the plurality of distributed application servers 320 for executing the applications and recording tracing information associated with the event.

The application tracing controller 720 in this example may receive a tracing request from a tracing requestor, e.g. a tester, an engineer, a technical supporter, an advertiser, etc. The tracing request may indicate a request to track an event, e.g. a clicking event related to an advertisement, a login event related to a user ID, etc. The requestor may send the request to check tracing information about the event, either because the requestor observes some trouble of the event or because the requestor wants to make sure everything is fine with the event. The application tracing controller 720 may then identify the trouble event based on the tracing request, and send the tracing request to the customized data determiner 722 for determining customized data.

In one embodiment, the application tracing controller 720 may also determine a trouble event to be monitored and tracked, based on a detection of an abnormality at the abnormality detector 730. The abnormality detector 730 in this example can detect abnormality related to an event. For example, the abnormality detector 730 may detect that: an ad conversion rate of an advertisement decreases or increases dramatically in a recent week; a click through rate of a link on the web page decreases or increases dramatically in a recent hour; multiple login failures related to a user ID; a failure of a hyperlink directed from an advertisement on the web page; etc. Based on a detected abnormality about an event, the abnormality detector 730 may send inform the application tracing controller 720, e.g. by sending a tracing request to the application tracing controller 720, that the event should be monitored and tracked for troubleshooting.

In accordance with the event determined to be monitored and/or tracked, the application tracing controller 720 may identify a user associated with the event. In addition, the application tracing controller 720 may determine whether to trace the event based on a test. An event can be traced either after the event is triggered by an online behavior of the user as discussed above, or based on a test, e.g. a test web page created by a technical supporter. In one example, after the application tracing controller 720 determines to track an event related to an advertisement, a test web page may be created to include the advertisement, such that once the advertisement is clicked on the test web page, e.g. by a tester or technical supporter, the event will be triggered and tracked accordingly. In this manner, there is no need to wait for the associated user to click on the advertisement. This can also be applied in an embodiment, where an event to be tracked may be determined without a specific associated user. For example, after the abnormality detector 730 detects a failure of a hyperlink related to an advertisement, probability no user will click on the advertisement for a while. In this case, to track the trouble event of the failed hyperlink, the application tracing controller 720 can instruct a tester to create a temporary web page to include the advertisement hyperlink and test the hyperlink by clicking on it. A script similar to what is embedded in the original web page may also be embedded in the temporary test web page. The script can trigger the event message being sent to the application tracing system 140 for tracking and execution, after the tester clicks on the advertisement hyperlink.

After the application tracing controller 720 determines the user ID of the user associated with the event, the application tracing controller 720 may send the user ID to the customized data determiner 722. The customized data determiner 722 in this example can retrieve a user profile associated with the user from the user profile database 723. Based on the user profile, the customized data determiner 722 can determine customized data related to the user and send the customized data to the script generator/updater 724.

The script generator/updater 724 in this example can generate or update a script, e.g. a Javascript as shown in FIG. 5, based on the customized data. The application tracing controller 720 may instruct the script generator/updater 724 whether to track the event based on the original web page or based on a test web page. Accordingly, the script generator/updater 724 may send the script to be embedded in either the original web page or a test web page, for triggering the event based on an online behavior either from the associated user or from a tester.

After the application tracing controller 720 determines to track the event based on the original web page, the application tracing controller 720 may also inform the trouble event detector 702 about the trouble event to be tracked, such that the trouble event detector 702 can monitor the event in case it is triggered.

In one embodiment, the application tracing controller 720 may receive a tracing complete notification, either from a tracing requestor or from a tester, to indicate that the tracing of a given event is complete. Then, the application tracing controller 720 can inform the trouble event detector 702 to stop monitoring the event accordingly.

Figure 8:
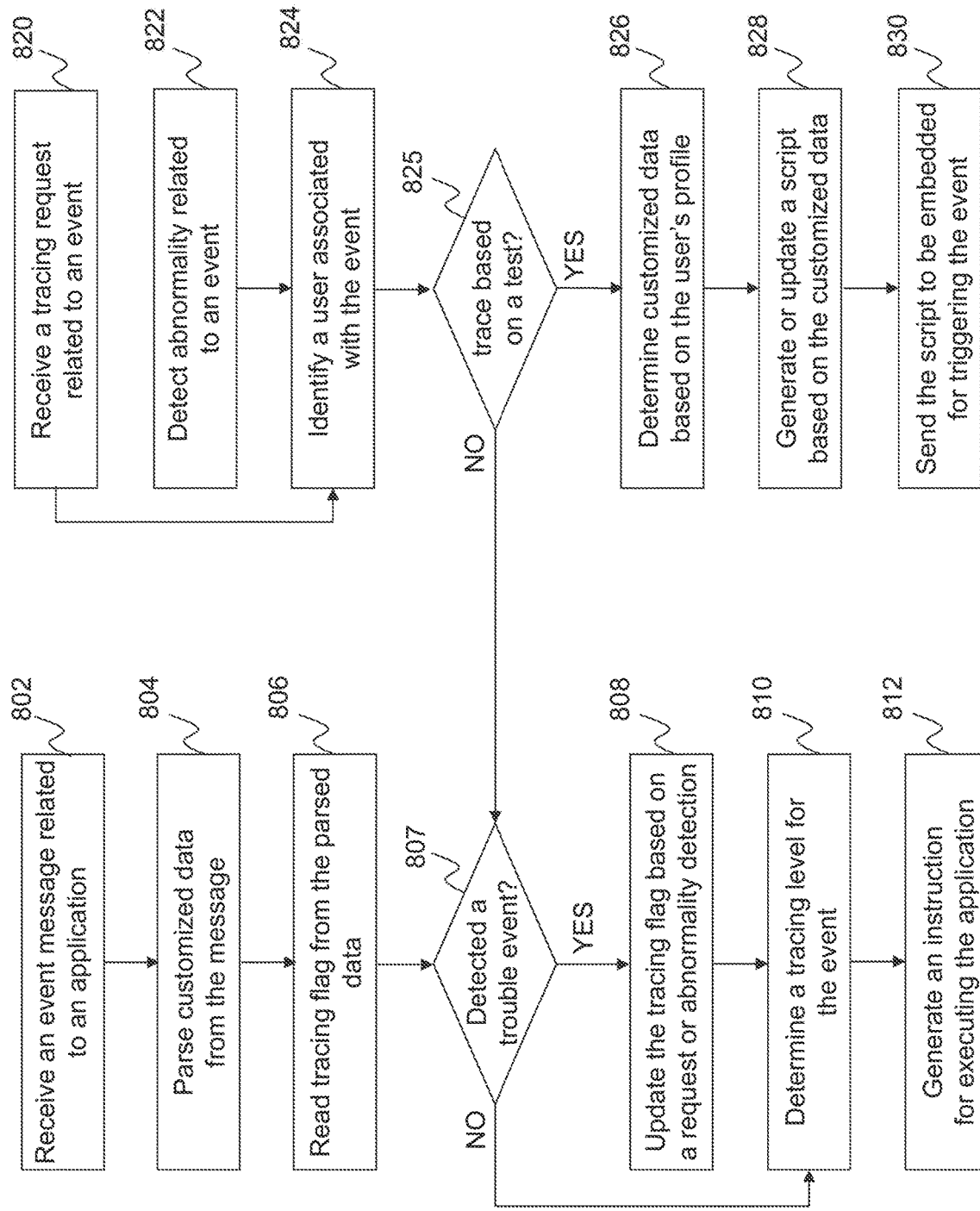
FIG. 8 is a flowchart of an exemplary process performed by a troubleshoot controlling engine, according to an embodiment of the present teaching.

FIG. 8 is a flowchart of an exemplary process performed by a troubleshoot controlling engine, e.g. the troubleshoot controlling engine 310 in FIG. 7, according to an embodiment of the present teaching. In this example, an event message related to an application is received at 802. At 804, customized data are parsed from the message. A tracing flag is read at 806 from the parsed data. The process then moves to 807.

At 820, a tracing request related to an event is received. At 822, abnormality related to an event is detected. At 824, a user associated with the event is identified, either based on the tracing request or based on the detected abnormality. At 825, it is determined whether to trace the event based on a test. If so, the process moves on to 826, where customized data are determined based on a user profile of the user. At 828, a script is generated or updated based on the customized data. The script is sent at 830 to be embedded for triggering the event.

If it is determined not to trace based on a test at 825, the process goes to 807, where it is determined whether a trouble event is detected among the received event messages from the original web page. If so, the process goes to 808 to update the tracing flag based on a tracing request or detected abnormality, e.g. turning on the tracing flag; and then the process goes to 810. If not, the process goes to 810 directly.

At 810, a tracing level is determined for tracking the event. At 812, an instruction is generated for executing the application and tracking the event at the same time.

It can be understood that the order of the steps shown in FIG. 8 may be changed according to different embodiments of the present teaching.

Figure 9:
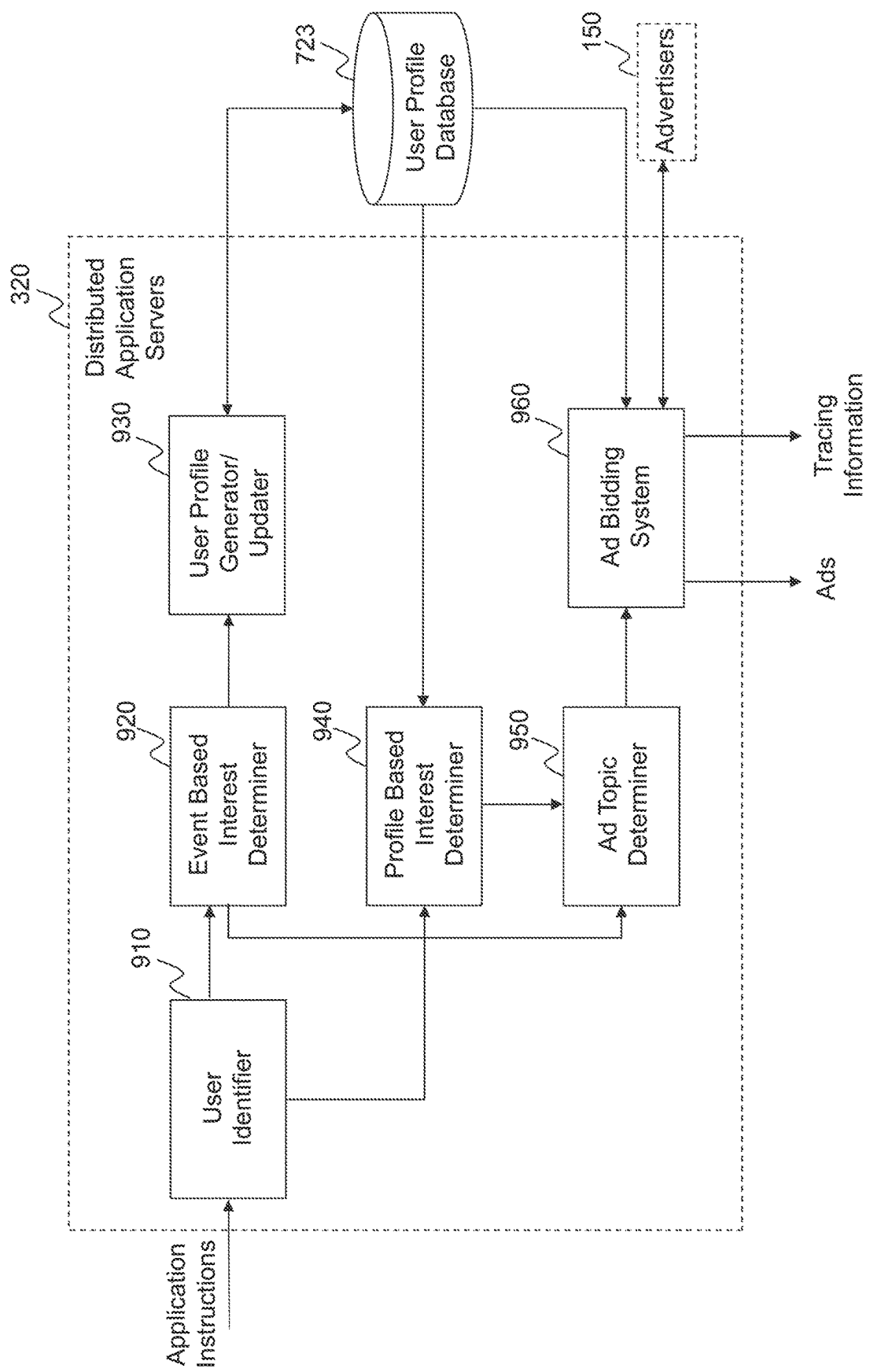
FIG. 9 illustrates an exemplary diagram of distributed application servers, according to an embodiment of the present teaching.

FIG. 9 illustrates an exemplary diagram of distributed application servers 320, according to an embodiment of the present teaching. In this embodiment, the plurality of distributed application servers 320 serve as an ad targeting system for determining advertisements to be presented to online users. In one example, the plurality of distributed application servers 320 can support an ad serving platform, e.g. a mobile search and native advertising platform like Yahoo Gemini. The plurality of distributed application servers 320 may send determined advertisements to the web page directly or through the ad serving platform. While FIG. 9 illustrates the ad targeting applications, it can be understood that the plurality of distributed application servers 320 can also serve for other applications where an event tracking is needed.

As shown in FIG. 9, the plurality of distributed application servers 320 in this example include a user identifier 910, an event based interest determiner 920, a user profile generator/updater 930, a profile based interest determiner 940, an ad topic determiner 950, and an ad bidding system 960. Each unit above may be executed by one or more distributed servers.

The user identifier 910 in this example receives an instruction from the troubleshoot controlling engine 310 for executing an application based on an event and tracking the event during the application execution. Based on the instruction, the user identifier 910 may identify the user associated with the event and send the user ID to the event based interest determiner 920 and the profile based interest determiner 940, along with the instruction.

The event based interest determiner 920 in this example receives the user ID and the instruction from the user identifier 910, and determines interest of the user based on the event. For example, based on an event that a user searches for "shoes" on a web page, the event based interest determiner 920 can determine that the user is interested in shoes. The event based interest determiner 920 can send the determined interest to the user profile generator/updater 930. The event based interest determiner 920 may also send the determined interest to the ad topic determiner 950 for determining an ad topic.

The user profile generator/updater 930 in this example may retrieve a user profile of the user from the user profile database 723 and update the user profile based on the determined interest. In one embodiment, when the user does not have a user profile, the user profile generator/updater 930 can generate a user profile for the user based on the determined interest, and store the user profile into the user profile database 723.

The profile based interest determiner 940 in this example receives user ID of the associated user, and retrieves a user profile of the user from the user profile database 723. Based on the user profile, the profile based interest determiner 940 may determine interests of the user, which are profile-based interests in contrast to event-based interests determined by the event based interest determiner 920. The profile based interest determiner 940 may send the profile-based interests of the user to the ad topic determiner 950 for determining an ad topic.

The ad topic determiner 950 in this example can determine a topic for advertisements to be presented to the user, based on the profile-based interests received from the profile based interest determiner 940 and/or the event-based interests received from the event based interest determiner 920. For example, the ad topic determiner 950 may determine a topic of sport utilities for the user based on profile-based interests of the user. In another example, the ad topic determiner 950 may determine a topic of clothes for the user based on an event-based interest of the user. In other example, the ad topic determiner 950 may determine one or more topics of advertisements for the user, after combining the profile-based interests and the event-based interests of the user in a manner. The ad topic determiner 950 may send the determined ad topic to the ad bidding system 960 for determining advertisements.

The ad bidding system 960 in this example can determine one or more advertisements in accordance with the ad topic, based on a bidding process performed with respect to the advertisers 150. In one embodiment, the ad bidding system 960 may determine the one or more advertisements based on a user profile of the user, e.g. based on the user's previous online ad clicking history. In another embodiment, the ad bidding system 960 may determine the one or more advertisements based on user profiles of other users, e.g. based on other users' previous online ad clicking history and ad preferences, especially when the user does not have enough information in the user profile to infer the user's own interest. The ad bidding system 960 may send the determined advertisement to the web page to be presented to the user, e.g. via an ad serving platform.

At each of the units in FIG. 9, the unit can check whether the tracing flag is on based on the application instruction. If so, the unit can generate tracing information, e.g. like the tracing strings shown in FIG. 6, during processing a corresponding task. Accordingly, if the tracing flag is on, the ad bidding system 960 can provide all tracing information generated during execution of tasks related to the event, to a tester, a technical supporter, or a tracing requestor, e.g. via the user interface 600 in FIG. 6.

Figure 10:
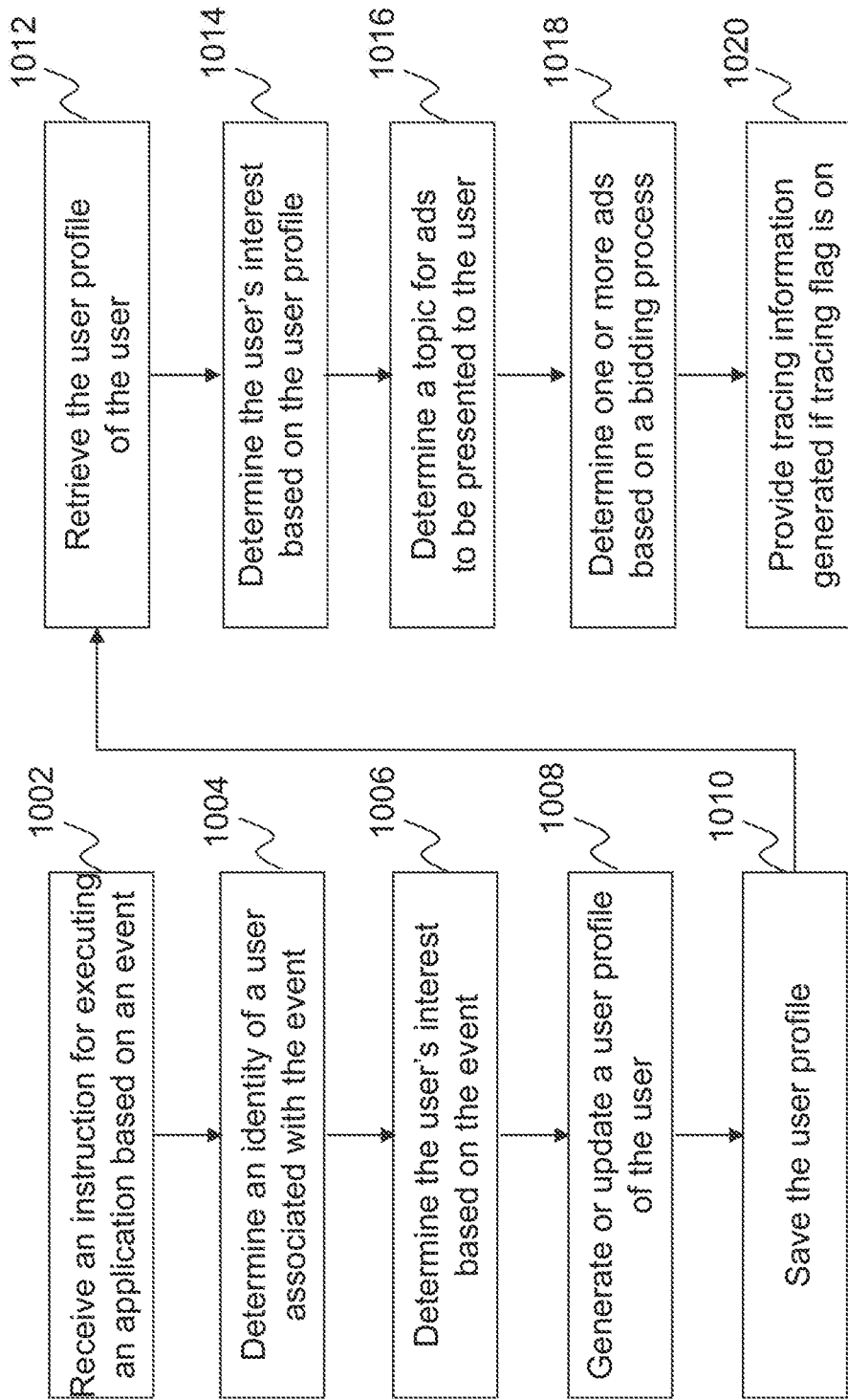
FIG. 10 is a flowchart of an exemplary process performed by distributed application servers, according to an embodiment of the present teaching.

FIG. 10 is a flowchart of an exemplary process performed by distributed application servers, e.g. the plurality of distributed application servers 320 in FIG. 9, according to an embodiment of the present teaching. At 1002, an instruction is received for executing an application based on an event and tracking the event. An identity of a user associated with the event is determined at 1004. An interest of the user is determined at 1006 based on the event. A user profile of the user is generated or updated at 1008, based on the event-based interest. The user profile is saved at 1010.

At 1012, a user profile of the user is retrieved. An interest of the user is determined at 1014 based on the user profile. At 1016, a topic is determined for advertisements to be presented to the user. At 1018, one or more ads are determined based on a bidding process. Tracing information generated during each step of the process may be provided at 1020, if tracing flag is on.

It can be understood that the order of the steps shown in FIG. 10 may be changed according to different embodiments of the present teaching.

Figure 11:
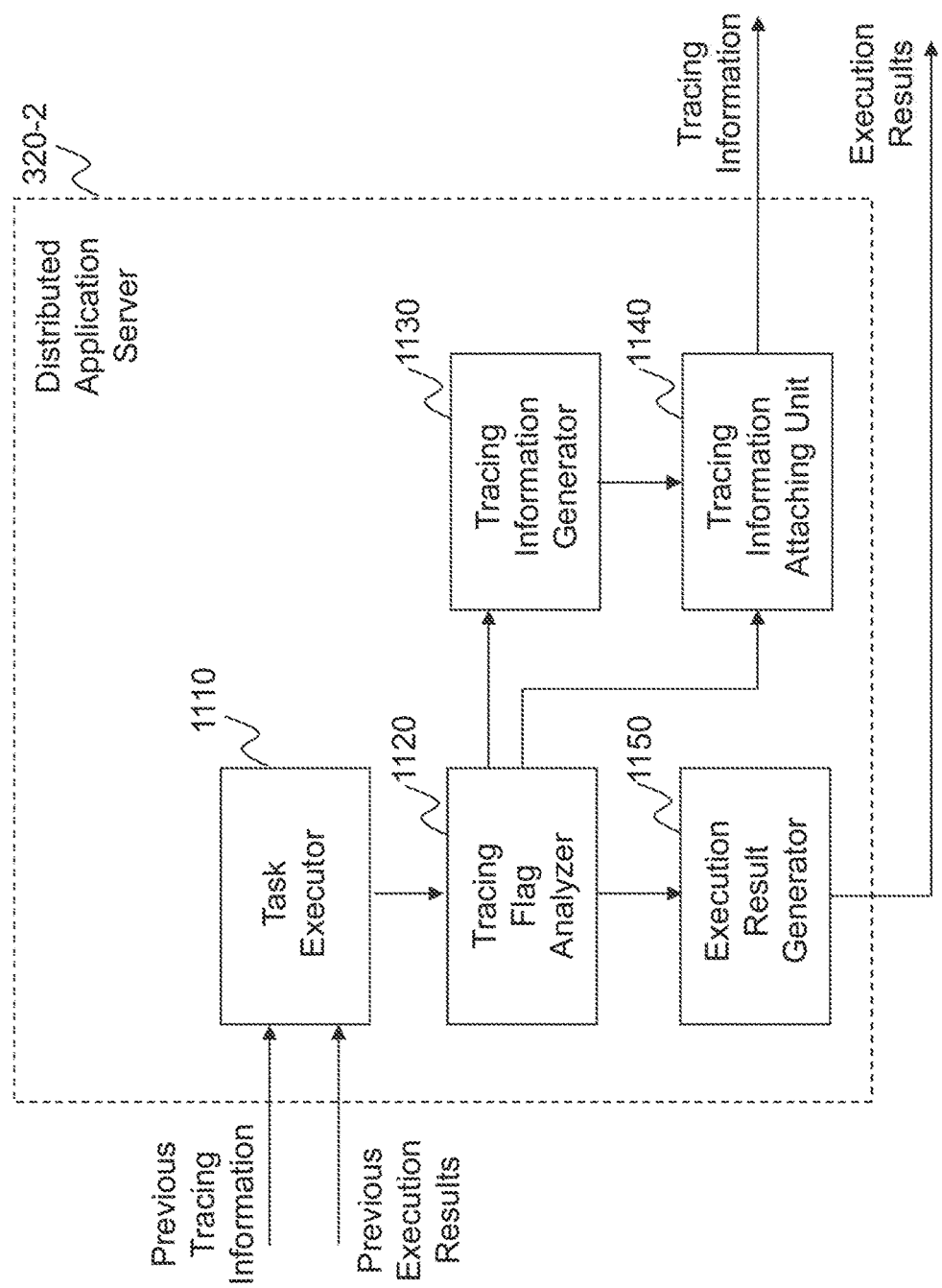
FIG. 11 illustrates an exemplary diagram of one distributed application server that can execute a task in an application, according to an embodiment of the present teaching.

FIG. 11 illustrates an exemplary diagram of one distributed application server 320-2 that can execute a task in an application, according to an embodiment of the present teaching. The distributed application server 320-2 in this example may be a server in a distributed system that can executes high-throughput applications in a distributed topology. The distributed application server 320-2 may be a typical server in the system to execute a task in the high-throughput applications based on previous execution results, and to provide its own execution result to subsequent servers.

As shown in FIG. 11, the distributed application server 320-2 in this example includes a task executor 1110, a tracing flag analyzer 1120, a tracing information generator 1130, a tracing information attaching unit 1140, and an execution result generator 1150.

The task executor 1110 in this example receives previous execution results from previous servers in the distributed system. The task executor 1110 can execute a corresponding task, e.g. based on the previous execution results. When the tracing flag is on to track a given event, the task executor 1110 may also receive previous tracing information generated by previous servers in the distributed system. The task executor 1110 may send the previous tracing information and/or some associated metadata received from the previous servers to the tracing flag analyzer 1120.

The tracing flag analyzer 1120 in this example can analyze a tracing flag of the event, e.g. based on previous tracing information and/or some associated metadata from the previous servers. If the tracing flag analyzer 1120 determines that the tracing flag is on, the tracing flag analyzer 1120 may inform the tracing information generator 1130 to generate tracing information, and provide the previous tracing information to the tracing information attaching unit 1140 for integration. If the tracing flag analyzer 1120 determines that the tracing flag is off, the tracing flag analyzer 1120 may inform the execution result generator 1150 to generate execution results directly, and provide the previous execution results to the execution result generator 1150 for integration.

The tracing information generator 1130 in this example can generate tracing information to reflect the execution process and results of the task at the distributed application server 320-2. The tracing information attaching unit 1140 in this example can integrate all tracing information generated so far for the event and send the integrated tracing information to the subsequent server in the distributed system.

The execution result generator 1150 in this example can generate the execution result of the task, and integrate all execution results generated so far for the event and send the integrated execution results to the subsequent server in the distributed system.

It can be understood that for the first server in the distributed system to execute a task related to the event, the server does not need previous tracing information or previous execution results; and for the last server in the distributed system to execute a task related to the event, the server can send the integrated tracing information and execution results to a user interface for read and troubleshooting.

Figure 12:
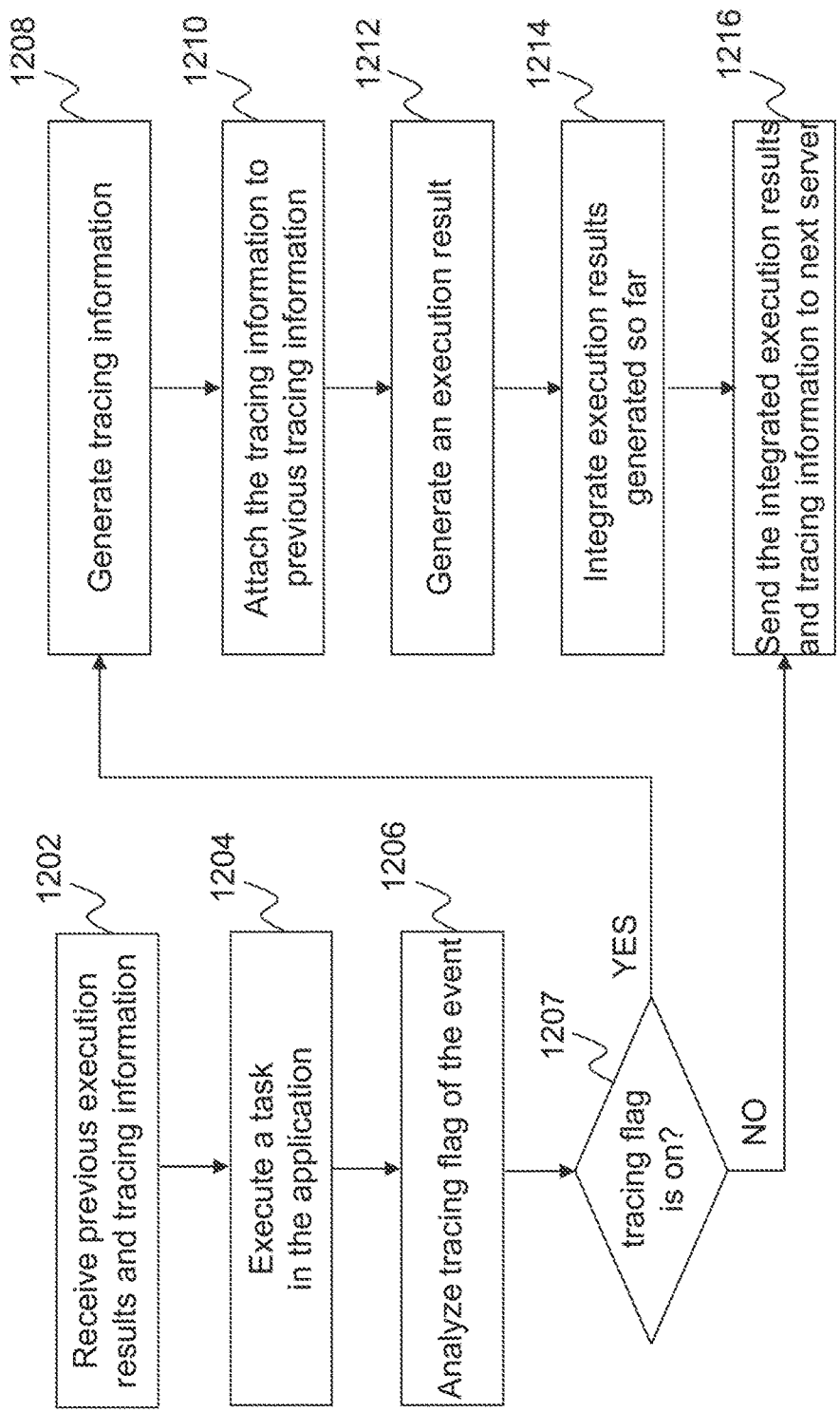
FIG. 12 is a flowchart of an exemplary process performed by one distributed application server, according to an embodiment of the present teaching.

FIG. 12 is a flowchart of an exemplary process performed by one distributed application server, e.g. the distributed application server 320-2 in FIG. 11, according to an embodiment of the present teaching. At 1202, previous execution results and tracing information are received. At 1204, a task in the application related to the event is executed at the server. At 1206, a tracing flag of the event is analyzed. At 1207, it is determined whether the tracing flag is on. If so, the process goes to 1208, where tracing information related to executing the task is generated. If not, the process directly goes to 1216.

At 1210, the tracing information is attached to previous tracing information. At 1212, an execution result is generated for the task. At 1214, execution results generated so far are integrated. At 1216, the integrated execution results and tracing information are sent to next server in the distributed system or to a user interface for read and troubleshooting.

It can be understood that the order of the steps shown in FIG. 12 may be changed according to different embodiments of the present teaching.

Figure 13:
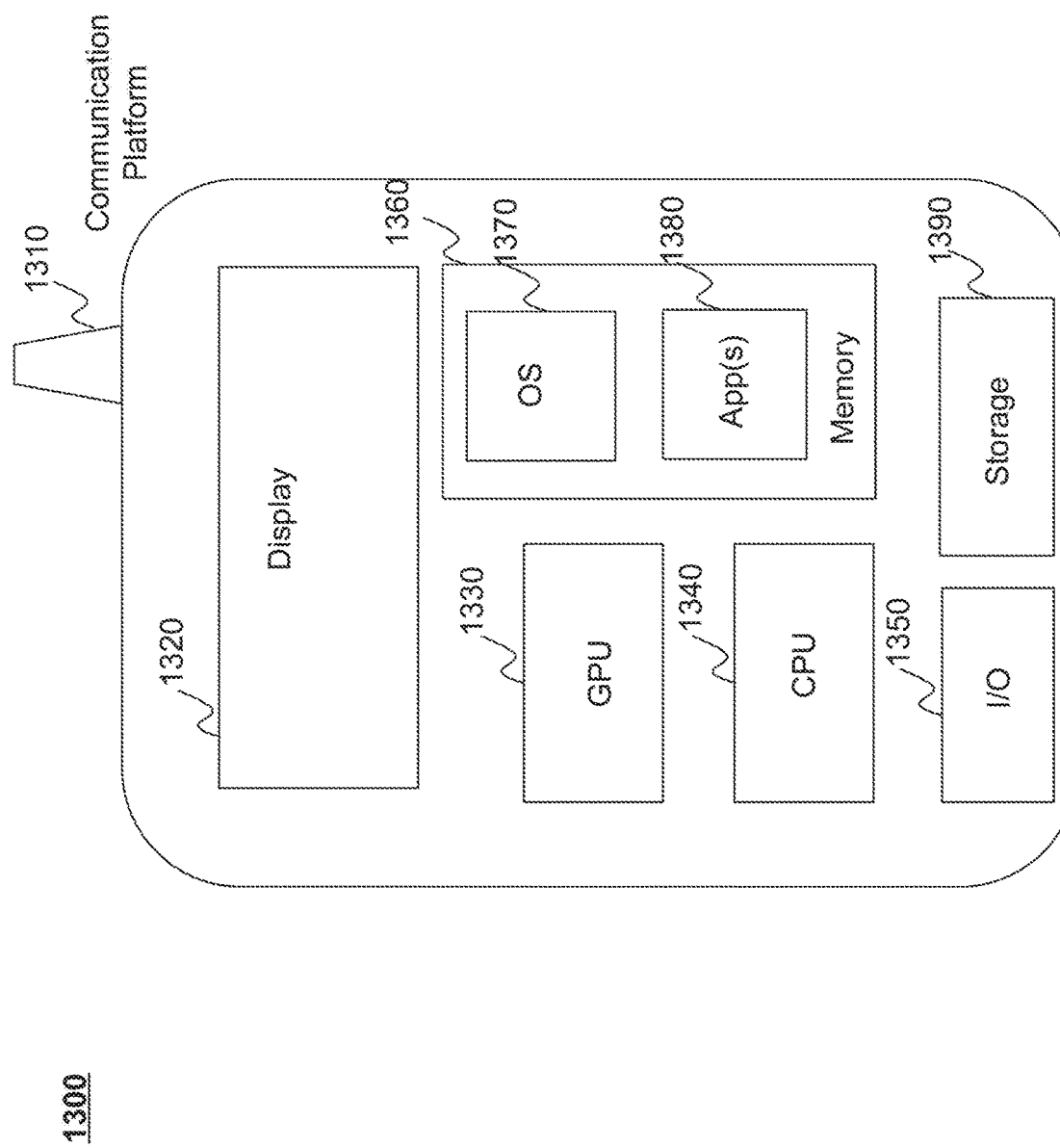
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which advertisements are presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving advertisements on the mobile device 1300. User interactions with the advertisements or other content items may be achieved via the I/O devices 1350 and provided to the application tracing system 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the application tracing system 140 and/or other components of systems 100 and 200 described with respect to FIGS. 1-12).

The hardware elements, operating systems and programming languages of such computers are conventional in nature, and it is presumed that those skilled in the art are adequately familiar therewith to adapt those technologies to tracking an event at a plurality of distributed servers as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
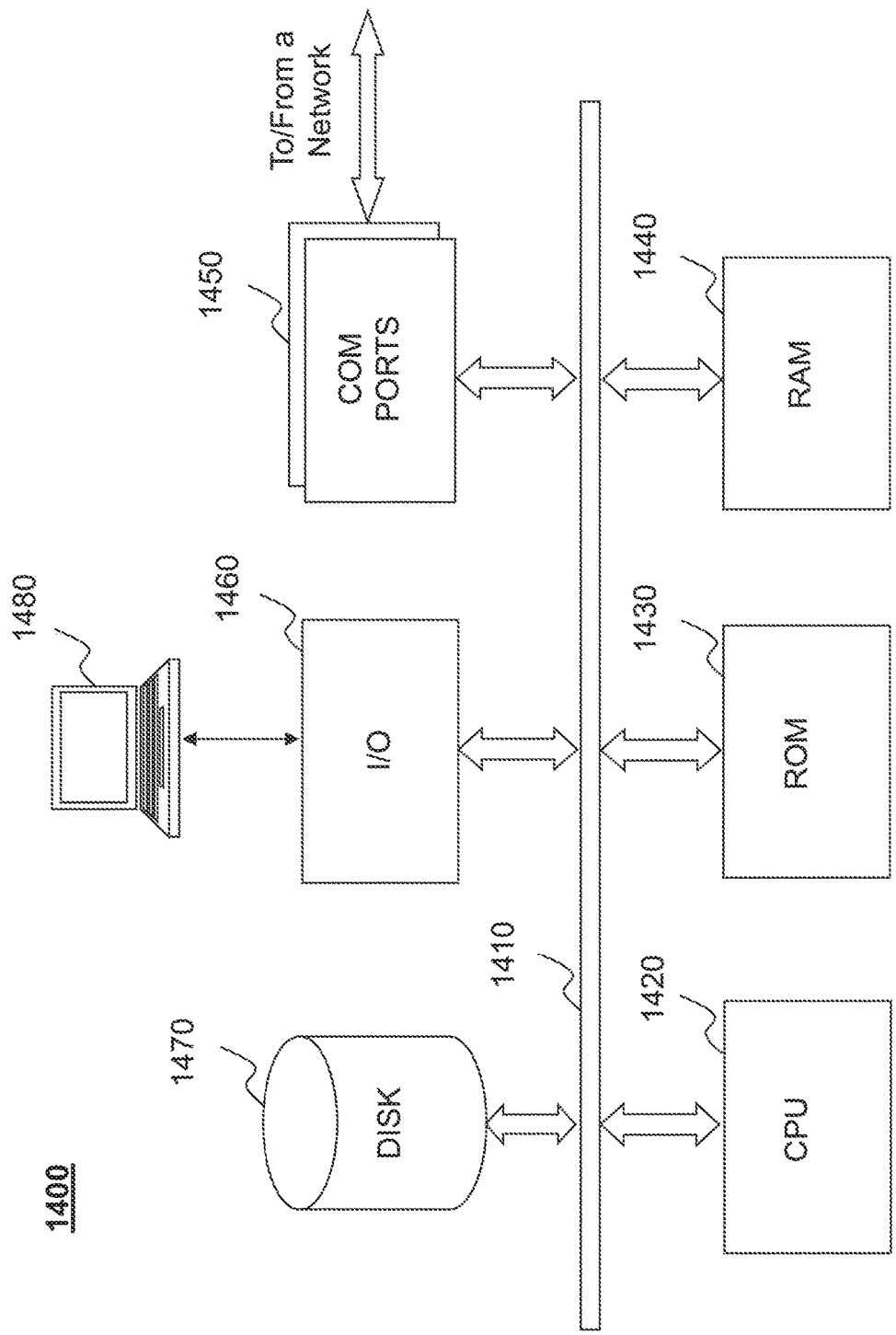
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the tracking an event at a plurality of distributed servers techniques, as described herein. For example, the application tracing system 140, etc., may be implemented on a computer such as computer 1400, via its hardware, software program, firmware, or a combination thereof. Although only one such computer is shown, for convenience, the computer functions relating to tracking an event at a plurality of distributed servers as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of tracking an event at a plurality of distributed servers, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with tracking an event at a plurality of distributed servers. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the tracking an event at a plurality of distributed servers as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for tracking an event associated with a user, the method comprising:
    receiving, by a first server from a second server of a plurality of sequentially arranged distributed servers, previous tracing information associated with the event and generated by the second server;
    in response to an abnormality related to the event detected by a troubleshoot controlling engine and a tracing flag turned on by the troubleshoot controlling engine based on the abnormality, receiving, by the first server based on the tracing flag, an instruction for executing a task in one or more applications related to the event associated with the user and for recording tracing information associated with the event based on a tracing level that is determined based on a user profile of the user; and
    performing, by the first server based on the instruction, the following:
        generating the tracing information including information about the task,
        integrating the tracing information with the previous tracing information to generate integrated tracing information, and
        sending, to a third server of the plurality of sequentially arranged distributed servers, the integrated tracing information.

2. The method of claim 1, wherein the tracing information includes information about the task.

3. The method of claim 1, further comprising:
    receiving previous execution results from the second server.

4. The method of claim 3, further comprising:
    executing, based on the previous execution results, the task to generate an execution result.

5. The method of claim 4, further comprising:
    integrating the execution result with the previous execution results to generate integrated execution results; and
    sending the integrated execution results to the third server.

6. The method of claim 1, further comprising:
    generating a report of all tracing information generated along an entire life span of the event; and
    sending the report to a manager related to a web page for troubleshooting.

7. The method of claim 1, further comprising:
    determining that the tracing flag of the event is turned on, wherein the generating the tracing information is based on the tracing flag.

8. A non-transitory, computer-readable medium having information recorded thereon for tracking an event associated with a user, when read by at least one processor, effectuate operations comprising:
    receiving, by a first server from a second server of a plurality of sequentially arranged distributed servers, previous tracing information associated with the event and generated by the second server;
    in response to an abnormality related to the event detected by a troubleshoot controlling engine and a tracing flag turned on by the troubleshoot controlling engine based on the abnormality, receiving, by the first server based on the tracing flag, an instruction for executing a task in one or more applications related to the event associated with the user and for recording tracing information associated with the event based on a tracing level that is determined based on a user profile of the user; and
    performing, by the first server based on the instruction, the following:
        generating the tracing information including information about the task,
        integrating the tracing information with the previous tracing information to generate integrated tracing information, and
        sending, to a third server of the plurality of sequentially arranged distributed servers, the integrated tracing information.

9. The medium of claim 8, wherein the tracing information includes information about the task.

10. The medium of claim 8, wherein the operations further comprise:
    receiving previous execution results from the second server.

11. The medium of claim 10, wherein the operations further comprise:
    executing, based on the previous execution results, the task to generate an execution result.

12. The medium of claim 11, wherein the operations further comprise:
    integrating the execution result with the previous execution results to generate integrated execution results; and
    sending the integrated execution results to the third server.

13. The medium of claim 8, wherein the operations further comprise:
    generating a report of all tracing information generated along an entire life span of the event; and
    sending the report to a manager related to a web page for troubleshooting.

14. The medium of claim 8, wherein the operations further comprise:
    determining that the tracing flag of the event is turned on, wherein the generating the tracing information is based on the tracing flag.

15. A system for tracking an event associated with a user, the system comprising:
    memory storing computer program instructions; and
    one or more processors that, in response to executing the computer program instructions, effectuate operations comprising:
    receiving, by a first server from a second server of a plurality of sequentially arranged distributed servers, previous tracing information associated with the event and generated by the second server;
    in response to an abnormality related to the event detected by a troubleshoot controlling engine and a tracing flag turned on by the troubleshoot controlling engine based on the abnormality, receiving, by the first server based on the tracing flag, an instruction for executing a task in one or more applications related to the event associated with the user and for recording tracing information associated with the event based on a tracing level that is determined based on a user profile of the user; and
    performing, by the first server based on the instruction, the following:
        generating the tracing information including information about the task,
        integrating the tracing information with the previous tracing information to generate integrated tracing information, and sending, to a third server of the plurality of sequentially arranged distributed servers, the integrated tracing information.

16. The system of claim 15, wherein the tracing information includes information about the task.

17. The system of claim 15, wherein the operations further comprise:
receiving previous execution results from the second server.

18. The system of claim 17, wherein the operations further comprise:
executing, based on the previous execution results, the task to generate an execution result.

19. The system of claim 18, wherein the operations further comprise:
integrating the execution result with the previous execution results to generate integrated execution results; and
sending the integrated execution results to the third server.

20. The system of claim 15, wherein the operations further comprise:
generating a report of all tracing information generated along an entire life span of the event; and
sending the report to a manager related to a web page for troubleshooting.

* * * * *